United States Patent

Finn et al.

(10) Patent No.: US 8,212,809 B2
(45) Date of Patent: Jul. 3, 2012

(54) FLOATING TRANSITIONS

(75) Inventors: Peter George Finn, Brampton (CA); Rick Allen Hamilton, II, Charlottesville, VA (US); Brian Marhsall O'Connell, Cary, NC (US); Clifford Alan Pickover, Yorktown Heights, NY (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1064 days.

(21) Appl. No.: 12/108,968

(22) Filed: Apr. 24, 2008

(65) Prior Publication Data

US 2009/0267937 A1    Oct. 29, 2009

(51) Int. Cl.
    *G06T 15/00*    (2011.01)
(52) U.S. Cl. ......................................................... 345/419
(58) Field of Classification Search .................. 345/419; 715/706
    See application file for complete search history.

(56) References Cited

U.S. PATENT DOCUMENTS

| | | | |
|---|---|---|---|
| 6,023,270 A | 2/2000 | Brush, II et al. | |
| 6,036,601 A | 3/2000 | Heckel | |
| 6,394,301 B1 | 5/2002 | Koch | |
| 6,421,047 B1 | 7/2002 | de Groot | |
| 6,532,007 B1 | 3/2003 | Matsuda | |
| 6,749,510 B2 | 6/2004 | Giobbi | |
| 6,788,946 B2 | 9/2004 | Winchell et al. | |
| 6,798,407 B1 | 9/2004 | Benman | |
| 6,868,389 B1 | 3/2005 | Wilkins et al. | |
| 6,895,406 B2 | 5/2005 | Fables et al. | |
| 6,954,728 B1 | 10/2005 | Kusumoto et al. | |
| 6,981,220 B2 * | 12/2005 | Matsuda | ................. 715/706 |
| 7,025,675 B2 | 4/2006 | Fogel et al. | |
| 7,158,135 B2 | 1/2007 | Santodomingo et al. | |
| 7,305,691 B2 | 12/2007 | Cristofalo | |
| 7,320,031 B2 | 1/2008 | Konig et al. | |
| 7,454,065 B2 | 11/2008 | Satoh | |
| 7,479,967 B2 | 1/2009 | Bachelder et al. | |
| 7,685,204 B2 | 3/2010 | Rogers | |
| 7,720,835 B2 | 5/2010 | Ward et al. | |
| 7,805,680 B2 | 9/2010 | Meyers et al. | |
| 7,822,687 B2 | 10/2010 | Brillon et al. | |
| 8,001,161 B2 | 8/2011 | Finn et al. | |

(Continued)

OTHER PUBLICATIONS

USPTO Office Action dated Aug. 24, 2011 for U.S. Appl. No. 12/353,656.

(Continued)

*Primary Examiner* — Xiao M. Wu
*Assistant Examiner* — Scott E Sonners
(74) *Attorney, Agent, or Firm* — Yee & Associates, P.C.; Mark C. Vallone

(57) ABSTRACT

A computer implemented method and apparatus for floating object transitions. In one embodiment, tracking data identifying a location of an avatar in relation to a range of an object in a virtual universe is received. The range comprises a viewable field. In response to the tracking data indicating an occurrence of a trigger condition, a set of flotation rules associated with the trigger condition is identified. An optimal location and orientation of the object is identified for each flotation action in a set of flotation actions associated with the set of flotation rules. The set of flotation actions are initiated to float the object above a surface. The object changes the location and orientation of the object in accordance with the set of flotation actions associated with the set of flotation rules.

18 Claims, 10 Drawing Sheets

U.S. PATENT DOCUMENTS

| | | | |
|---|---|---|---|
| 2002/0024532 | A1 | 2/2002 | Fables et al. |
| 2002/0056091 | A1 | 5/2002 | Bala et al. |
| 2002/0107072 | A1 | 8/2002 | Giobbi |
| 2002/0113809 | A1 | 8/2002 | Akazawa et al. |
| 2002/0169644 | A1 | 11/2002 | Greene |
| 2003/0004774 | A1 | 1/2003 | Greene et al. |
| 2004/0034561 | A1 | 2/2004 | Smith |
| 2004/0053690 | A1 | 3/2004 | Fogel et al. |
| 2004/0166935 | A1 | 8/2004 | Gavin et al. |
| 2004/0210634 | A1 | 10/2004 | Ferrer et al. |
| 2004/0220850 | A1 | 11/2004 | Ferrer et al. |
| 2005/0071306 | A1 | 3/2005 | Kruszewski et al. |
| 2005/0086112 | A1 | 4/2005 | Shkedi |
| 2005/0086605 | A1 | 4/2005 | Ferrer et al. |
| 2005/0114198 | A1 | 5/2005 | Koningstein et al. |
| 2005/0156928 | A1 | 7/2005 | Santodomingo et al. |
| 2005/0179685 | A1* | 8/2005 | Kake et al. ............ 345/419 |
| 2005/0253872 | A1 | 11/2005 | Goss et al. |
| 2005/0286769 | A1 | 12/2005 | Satoh |
| 2006/0168143 | A1 | 7/2006 | Moetteli |
| 2006/0194632 | A1 | 8/2006 | Hendrickson et al. |
| 2006/0195462 | A1 | 8/2006 | Rogers |
| 2006/0258462 | A1 | 11/2006 | Cheng et al. |
| 2007/0035561 | A1 | 2/2007 | Bachelder et al. |
| 2007/0043616 | A1 | 2/2007 | Kutaragi et al. |
| 2007/0191104 | A1 | 8/2007 | Van Luchene |
| 2007/0247979 | A1 | 10/2007 | Brillon et al. |
| 2007/0252841 | A1 | 11/2007 | Kim |
| 2007/0261109 | A1 | 11/2007 | Renaud et al. |
| 2008/0004119 | A1 | 1/2008 | Van Luchene et al. |
| 2008/0252716 | A1 | 10/2008 | Kano et al. |
| 2008/0281622 | A1 | 11/2008 | Hoal |
| 2009/0063168 | A1 | 3/2009 | Finn et al. |
| 2009/0089157 | A1 | 4/2009 | Narayanan |
| 2009/0227368 | A1 | 9/2009 | Wyatt |
| 2009/0254417 | A1 | 10/2009 | Beilby et al. |
| 2009/0267948 | A1 | 10/2009 | Finn et al. |
| 2009/0267950 | A1 | 10/2009 | Finn et al. |
| 2009/0267960 | A1 | 10/2009 | Finn et al. |
| 2009/0271422 | A1 | 10/2009 | Finn et al. |
| 2009/0299960 | A1 | 12/2009 | Lineberger |
| 2009/0327219 | A1 | 12/2009 | Finn et al. |
| 2010/0001993 | A1 | 1/2010 | Finn et al. |
| 2010/0005423 | A1 | 1/2010 | Finn et al. |
| 2010/0177117 | A1 | 7/2010 | Finn et al. |
| 2010/0205179 | A1 | 8/2010 | Carson et al. |

OTHER PUBLICATIONS

USPTO Office Action for U.S. Appl. No. 12/109,040 dated Feb. 3, 2011.
USPTO office action for U.S. Appl. No. 12/168,657 dated Apr. 26, 2011.
USPTO notice of allowance for U.S. Appl. No. 12/109,023 dated Apr. 13, 2011.
PTO Office Action for U.S. Appl. No. 12/109,040 dated Jul. 15, 2011.
Kiss et al., "Viewpoint Adaptation During Navigation Based on Stimuli from the Virtual Environment" Web3D 03' Proceedings of the Eighth International Conference on 3D Web Technology, ACM, New York, NY, 2003, p. 23.
U.S. Appl. No. 12/108,925, filed Apr. 24, 2008, Finn et al.
U.S. Appl. No. 12/108,987, filed Apr. 24, 2008, Finn et al.
U.S. Appl. No. 12/109,010, filed Apr. 24, 2008, Finn et al.
U.S. Appl. No. 12/165,922, filed Jul. 1, 2008, Finn et al.
U.S. Appl. No. 12/109,023, filed Apr. 24, 2008, Finn et al.
U.S. Appl. No. 12/109,040, filed Apr. 24, 2008, Finn et al.
U.S. Appl. No. 12/168,657, filed Jul. 7, 2008, Finn et al.
U.S. Appl. No. 11/846,724, filed Aug. 29, 2007, Finn et al.
USPTO office action for U.S. Appl. No. 12/109,023 dated Dec. 1, 2010.
Avatar-Based Marketing: The Avatar-Based Panel (Part One of Five), New World Notes, http://nwn.blogs.com/nwn/2006/06/avatarbased_mar.html, accessed Nov. 10, 2011, 15 pages.
Avatar-Based Marketing: The Avatar-Based Panel (Part Two of Five), New World Notes, http://nwn.blogs.com/nwn/2006/06/avatarbased_mar.html, accessed Nov. 10, 2011, 6 pages.
Avatar-Based Marketing: The Avatar-Based Panel (Part Three of Five), New World Notes, http://nwn.blogs.com/nwn/2006/06/avatarbased_mar.html, accessed Nov. 10, 2011, 6 pages.
Avatar-Based Marketing: The Avatar-Based Panel (Part Four of Five), New World Notes, http://nwn.blogs.com/nwn/2006/06/avatarbased_mar.html, accessed Nov. 10, 2011, 6 pages.
Avatar-Based Marketing: The Avatar-Based Panel (Part One of Five), New World Notes, http://nwn.blogs.com/nwn/2006/06/avatarbased_mar.html, accessed Nov. 10, 2011, 6 pages.
Hughes, "Those custom Reeboks and the next party," Eightbar, http://eightbar.co.uk/2006/10/11/those-custom-reeboks-and-the-next-party, accessed Oct. 11, 2006, 5 pages.
Hughes, "Planes, trains and automobiles, here come Nissan," Eightbar, http://eightbar.co.uk/2006/10/24/planes-trains-and-automobiles-here-come-nissan, Oct. 24, 2006, 3 pages.
Hughes, "The Sony BMG media island, it is very good," Eightbar, http://eightbar.co.uk/2006/10/19/the-sony-bmg-media-island-it-is-very-good, Oct. 19, 2006, 8 pages.
Hughes, "Ben Folds in Second Life the Event," Eightbar, http://eightbar.co.uk/2006/10/20/ben-folds-in-second-life-the-event, Oct. 20, 2006, 3 pages.
Reynolds, "Virtual Worlds introduction presentation," Eightbar, http://eightbar.co.uk/2006/08/17/virtual-worlds-introduction-presentation, Aug. 17, 2006, 8 pages.
"Life2Life—ECS-Powered Amazon Store Within Second Life," Amazon Web Services Blog, http://aws.typepad.com/aws/2006/07/lifetolife_ecspo.html, accessed Nov. 10, 2011, 7 pages.
"Trap," NWN Wikia, http://web.archive.org/web/20071112084836/http://nwn.wikia.com/wiki/Trap, accessed Sep. 14, 2011, 3 pages.
"Unseen," WOW Wiki, http://web.archive.org/web/20070207113119/http://www.wowwiki.com/Unseen, accessed Sep. 14, 2011, 2 pages.
USPTO Office Action regarding U.S. Appl. No. 11/846,724, dated Oct. 27, 2010.
USPTO Final Office Action regarding U.S. Appl. No. 11/846,724, dated Feb. 4, 2011.
USPTO Office Action regarding U.S. Appl. No. 12/108,925, dated Sep. 9, 2011.
USPTO Supplemental Notice of Allowance regarding U.S. Appl. No. 12/109,023, dated May 13, 2011.
USPTO Office Action regarding U.S. Appl. No. 12/165,922, dated Nov. 10, 2011.
USPTO Final Office Action regarding U.S. Appl. No. 12/168,657, dated Oct. 4, 2011.
Gladestrider, "ZAM Everquest Classes: The Ranger—Tracking-Help," http://everquest.allakhazam.com/db/classes.html?=10&mid=1098807428716491276, dated Oct. 26, 2004, 2 pages.
Riddikulus, "Dungeons and Dragons Online Eberron Unlimited Forums: Repeating quests-limit?" http://forums.ddo.com/showthread.php?t=123676, dated Oct. 8, 2007, 6 pages.
USPTO Notice of Allowance regarding U.S. Appl. No. 12/108,925, dated Dec. 29, 2011, 18 pages.
USPTO Office Action regarding U.S. Appl. No. 12/108,987, dated Dec. 1, 2011, 39 pages.
USPTO Office Action regarding U.S. Appl. No. 12/109,010, dated Jan. 30, 2012, 43 pages.
USPTO Final Office Action regarding U.S. Appl. No. 12/353,656, dated Dec. 23, 2011, 47 pages.

* cited by examiner

OBJECT AVATAR
RENDERING (OAR) TABLE
400

| | |
|---|---|
| 402 | RenderingUUID = PRIMARY KEY. |
| 404 | ObjectUUID = FOREIGN KEY TO EXISTING OBJECT TABLE. |
| 406 | AvatarUUID = FOREIGN KEY TO EXISTING AVATAR TABLE. |
| 408 | Zone1EnterTime = UTC DATETIME WHEN AVATAR'S SESSION STARTED (WHEN THEY ENTERED THE FIRST ZONE, ASSUMING A TWO ZONE MODEL). |
| 410 | Zone1LeaveTime = UTC DATETIME WHEN AVATAR LEFT THE FIRST ZONE. |
| 412 | Zone2EnterTime = UTC DATETIME WHEN AVATAR'S SESSION STARTED (WHEN THEY ENTERED THE SECOND ZONE, ASSUMING A TWO THRESHOLD MODEL). |
| 414 | Zone2LeaveTime = UTC DATETIME WHEN AVATAR LEFT THE SECOND ZONE. |
| 416 | NumberOfZone1Enters = NUMERIC COUNTER OF HOW MANY TIMES AVATAR HAS ENTERED THE FIRST ZONE. |
| 418 | NumberOfZone2Enters = NUMERIC COUNTER OF HOW MANY TIMES AVATAR HAS ENTERED THE SECOND ZONE. |
| 420 | LastCoordinates = COORDINATE DATA OF WHERE THE AVATAR IS WITHIN THE ZONES (TYPICALLY AN XYZ SYSTEM). |

*FIG. 4*

OBJECT FLOATING
CONTROL TABLE
500

| | |
|---|---|
| 502 | OBJECT UUID = PRIMARY KEY |
| 504 | FLOTATION RULE UUID = FOREIGN KEY |
| 506 | FLOTATION RULE PRIORITY = NUMERIC DESIGNATING PRIORITY OF RULE |

*FIG. 5*

| OBJECT BASED AVATAR TABLE 1000 | |
|---|---|
| RENDERING UUID = PRIMARY KEY | |
| 1002 OBJECT A UUID | AVATAR A UUID — 1004 |
| | AVATAR A ZONE 1 ENTER TIME — 1006 |
| | AVATAR A ZONE 2 ENTER TIME — 1008 |
| | AVATAR A ZONE 1 LEAVE TIME — 1010 |
| | AVATAR A ZONE 2 LEAVE TIME — 1012 |
| 1020 OBJECT B UUID | AVATAR A UUID — 1022 |
| | AVATAR A ZONE 1 ENTER TIME — 1024 |
| | AVATAR A ZONE 2 ENTER TIME — 1026 |
| | AVATAR A ZONE 1 LEAVE TIME — 1028 |
| | AVATAR A ZONE 2 LEAVE TIME — 1030 |
| | AVATAR C UUID — 1032 |
| | AVATAR C ZONE 1 ENTER TIME — 1034 |
| | AVATAR C ZONE 2 ENTER TIME — 1036 |
| | AVATAR C ZONE 1 LEAVE TIME — 1038 |
| | AVATAR C ZONE 2 LEAVE TIME — 1040 |

*FIG. 10*

FLOATING TRANSITIONS

BACKGROUND OF THE INVENTION

1. Field of the Invention

The present invention is related generally to a data processing system and in particular to a method and apparatus for managing objects in a virtual universe. More particularly, the present invention is directed to a computer implemented method, apparatus, and computer usable program code for floating designated objects within a virtual universe.

2. Description of the Related Art

A virtual universe (VU), also referred to as a metaverse or "3D Internet", is a computer-based simulated environment. Examples of virtual universes include Second Life®, Entropia Universe, The Sims Online®, There, and Red Light Center. Other examples of virtual universes include multiplayer online games, such as EverQuest®, Ultima Online®, Lineage®, and World of Warcraft® (WoW).

Many virtual universes are represented using three dimensional (3-D) graphics and landscapes. The properties and elements of the virtual universe often resemble the properties of the real world, such as in terms of physics, houses, and landscapes. Virtual universes may be populated by thousands of users simultaneously. In a virtual universe, users are sometimes referred to as "residents."

The users in a virtual universe can interact, inhabit, and traverse the virtual universe through the use of avatars. An avatar is a graphical representation of a user that other users in the virtual universe can see and interact with. The avatar's appearance is typically selected by the user and often takes the form of a cartoon-like representation of a human. However, avatars may also have non-human appearances, such as animals, elves, trolls, orcs, fairies, and other fantasy creatures.

A viewable field is the field of view for a particular user. The viewable field for a particular user may include objects, as well as avatars belonging to other users. An object is an element in a virtual universe that does not represent a user. An object may be, for example, buildings, statues, billboards, signs, and advertisements in the virtual universe. The viewable field of a particular user is determined by the virtual universe grid software according to the geometries and textures that are currently loaded in a user's virtual universe client. The virtual universe grid determines the length of time that a user views an object based on processing the data sent to each virtual universe client.

Objects are prevalent in virtual universes. Sometimes one or more objects in a particular user's viewable field may be obstructed from view by other objects in the virtual environment such that the user is unable to see the one or more obstructed objects. For example, a sign may be hidden from view behind a statue or other larger sign. In addition, objects may prove difficult for some users to view based on their relative position and other characteristics, such as lighting and color.

SUMMARY OF THE INVENTION

The illustrative embodiments provide a computer implemented method and apparatus for floating object transitions. In one embodiment, tracking data identifying a location of an avatar in relation to a range of an object in a virtual universe is received. The range comprises a viewable field. In response to the tracking data indicating an occurrence of a trigger condition, a set of flotation rules associated with the trigger condition is identified. An optimal location and orientation of the object is identified for each flotation action in a set of flotation actions associated with the set of flotation rules. The set of flotation actions are initiated to float the object above a surface. The object changes the location and orientation of the object in accordance with the set of flotation actions associated with the set of flotation rules.

BRIEF DESCRIPTION OF THE SEVERAL VIEWS OF THE DRAWINGS

FIG. 4 is a block diagram of an object avatar rendering table in accordance with an illustrative embodiment;

FIG. 5 is a block diagram of an object floating control table in accordance with an illustrative embodiment;

FIG. 10 is a block diagram of an object based avatar table for a plurality of objects in accordance with an illustrative embodiment;

DETAILED DESCRIPTION OF THE INVENTION

Figure 1:
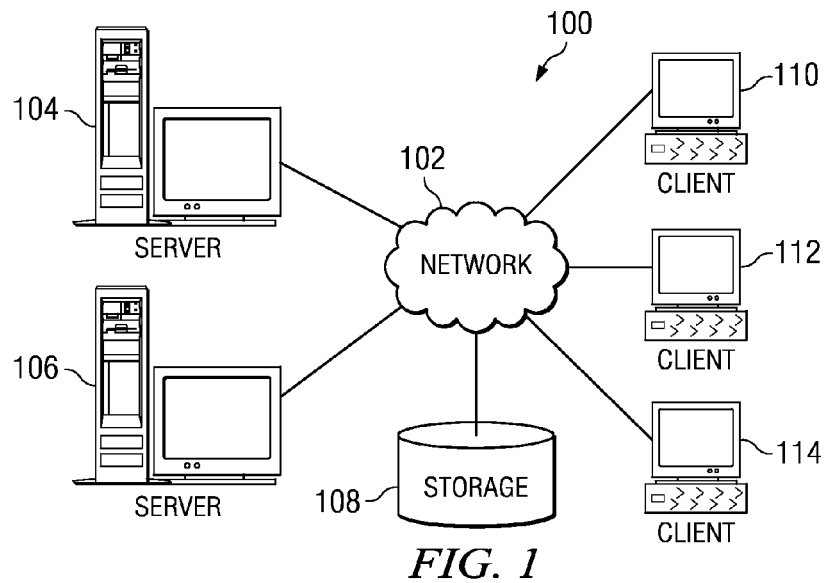
FIG. 1 is a block diagram illustrating a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable data storage medium(s) may be utilized. The computer-usable or computer-readable data storage medium may be, for example but not limited to, an electronic, magnetic, optical, or semiconductor system, apparatus, or device. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable data storage medium may be any medium that can store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
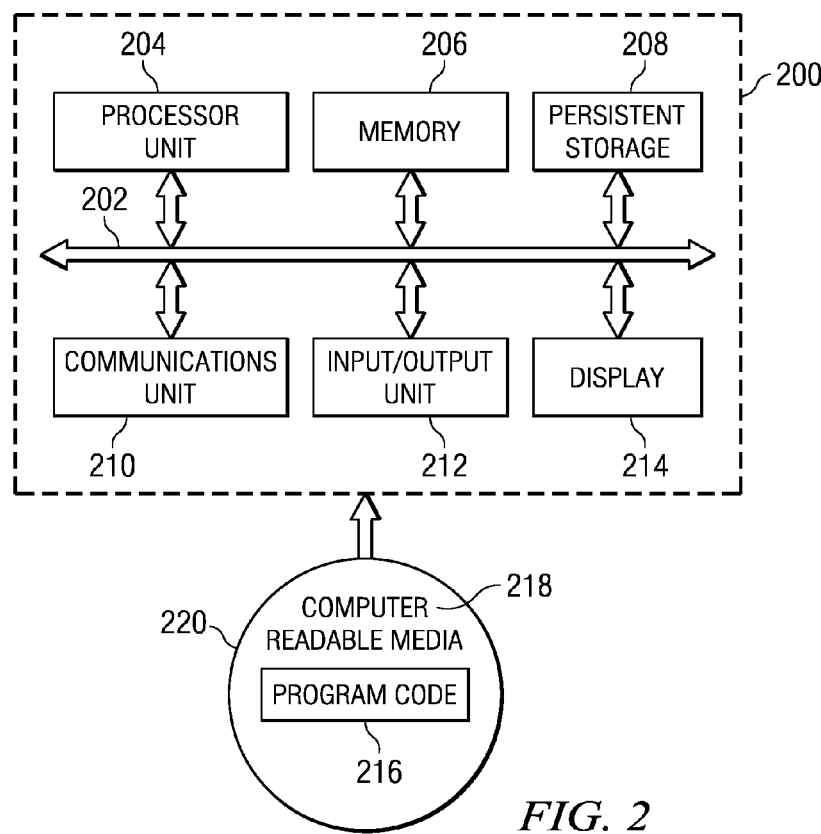
FIG. 2 is a diagram of a data processing system in accordance with an illustrative embodiment of the present invention.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. Servers 104 and 106 are servers associated with a virtual universe. Users of the virtual universe have agents on servers 104 and 106. An agent is a user's account. A user uses an agent to build an avatar representing the user. The agent is tied to the inventory of assets or possessions the user owns in the virtual universe. In addition, a region in a virtual universe typically resides on a single server, such as, without limitation, server 104. A region is a virtual area of land within the virtual universe.

Clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example.

In a virtual universe, assets, avatars, the environment, and anything visual consists of unique identifiers (UUIDs) tied to geometric data, textures, and effects data. Geometric data is distributed to a user's client computer as textual coordinates. Textures are distributed to a user's client computer as graphics files, such as Joint Photographic Experts Group (JPEG) files. Effects data is typically rendered by the user's client according to the user's preferences and the user's client device capabilities.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments. Network data processing system 100 may include additional servers, clients, and other devices not shown.

Turning now to FIG. 2, a diagram of a data processing system is depicted in accordance with an illustrative embodiment of the present invention. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

A virtual universe is a computer-simulated environment, such as, without limitation, Second Life®, Entropia Universe, The Sims Online®, There, Red Light Center, EverQuest®, Ultima Online®, Lineage®, and World of Warcraft®. A virtual universe is typically represented using three dimensional (3-D) graphics and landscapes.

The users in the virtual universe interact, inhabit, and traverse the virtual universe through avatars. Avatars represent users and are controlled or associated with users. A user can view objects and other avatars within a given proximity of the user's avatar. The virtual universe grid software determines which objects and other avatars are within the given proximity of the user's avatar according to the geometries and textures that are currently loaded in the user's virtual universe client. The virtual universe grid determines the length of time that a user views an object or other avatar in proximity of the user based on processing the data sent to each virtual universe client. However, current virtual universe systems do not enable tracking of objects and avatars within a range of one or more selected objects.

The illustrative embodiments provide a computer implemented method and apparatus for floating object transitions. In one embodiment, tracking data identifying a location of an avatar in relation to a range of an object in a virtual universe is received. The range comprises a viewable field. In response to the tracking data indicating an occurrence of a trigger condition, a set of flotation rules associated with the trigger condition is identified. An optimal location and orientation of the object is identified for each flotation action in a set of flotation actions associated with the set of flotation rules. The set of flotation actions are initiated. The object changes the location and orientation of the object in accordance with the set of flotation actions associated with the set of flotation rules.

The flotation action is any type of floating, hovering, or changing locations to improve the visibility and viewability of the object. For example, a flotation action includes, without limitation, floating in a fixed/stationary position, bobbing up and down vertically, moving side to side horizontally, moving up and down in an arc, teleporting, hovering in one or more locations, rotating about an axis, pivoting so that a front of the object is facing the avatar, floating along a random path through the air, floating from a first location to a second location so that users can see the object as the object moves to the second location, moving in a zigzag pattern through the air, and/or disappearing from a first location and reappearing at a second location so that avatars cannot see the object until the object is rendered at the second location.

Figure 3:
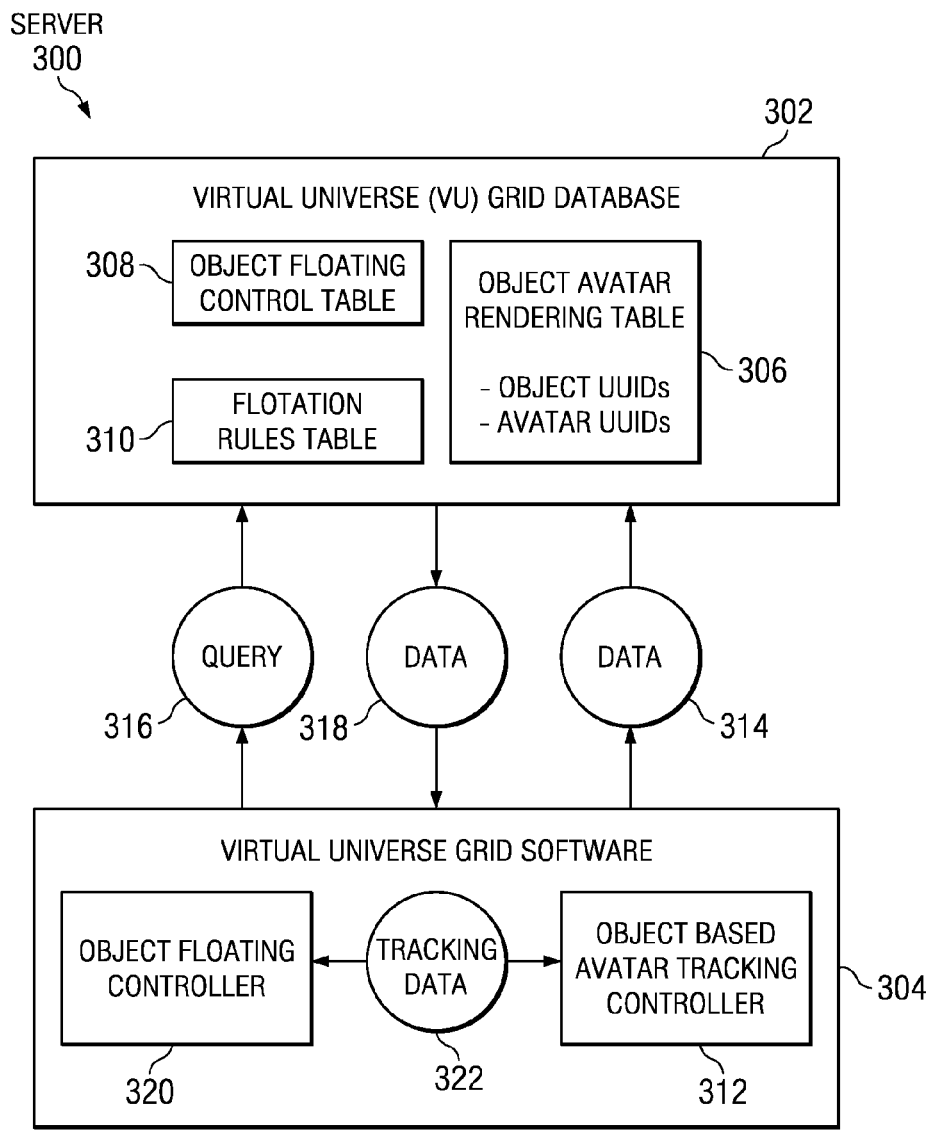
FIG. 3 is a block diagram illustrating a virtual universe grid server in accordance with an illustrative embodiment.

FIG. 3 is a block diagram illustrating a virtual universe grid server in accordance with an illustrative embodiment. Server 300 is a server associated with a virtual universe. In this example, server 300 is a server in a virtual universe grid computing system or in a cluster of two or more servers for rendering and managing a virtual universe. In another embodiment, server 300 is a single, stand-alone server.

Virtual universe grid database 302 is a database on the grid computing system for storing data used by virtual universe grid software 304 to render and manage the virtual universe. Virtual universe grid database 302 includes object avatar rendering (OAR) table 306. Object avatar rendering table 306 stores object unique identifiers and avatar unique identifiers.

In a virtual universe, assets, avatars, the environment, and anything visual consists of unique identifiers (UUIDs) tied to geometric data, textures, and effects data. Geometric data is data associated with the form or shape of avatars and objects in the virtual universe. Geometric data may be used to construct a wire frame type model of an avatar or object. Geometric data is distributed to a user's client computer as textual coordinates. Textures are distributed to a user's client computer as graphics files, such as JPEG files. Texture data refers to the surface detail and surface textures or color that is applied to wire-frame type geometric data to render the object or avatar. Effects data is typically rendered by the user's client according to the user's preferences and the user's client device capabilities.

Object avatar rendering table 306 stores a unique identifier (UUID) for each selected object in the virtual universe. A selected object is an object in a plurality of objects in the virtual universe that is tracked, monitored, managed, or associated with object avatar rendering table 306. Object avatar rendering table 306 also stores unique identifiers and other data describing avatars within a viewable field of a selected object or within a selected zone or range associated with the selected object. For example, if the selected objects include object A and object B, then object avatar rendering table 306 stores object A unique identifier, unique identifiers and other data for all avatars within the viewable field of object A, object B unique identifier, and unique identifiers and other data describing all avatars within the viewable field of object B.

Virtual universe grid database 302 also includes object floating control (OFC) table 308 and flotation rules (FR) table 310. Object floating control table 308 is a table storing object unique identifiers (UUIDs) and flotation rules. Flotation rules govern modifications to an object, such as, without limitation, how high an object floats above a surface, where an object floats, changes in location of the object, and/or changes in orientation of the object. A flotation rule specifies an action, motion, or change in the selected object.

Flotation rules may include set coordinates within which an object floats, coordinates at which an object does not float, a minimum and/or a maximum distance the selected object can float away from a given avatar, a minimum and/or maximum distance the selected object can float from a given fixed location, a minimum and/or maximum height above a surface, and/or a minimum distance that must be maintained away from another object, such as a competitor's building or advertisement. In other words, the flotation rules may specify where an object can float and where an object cannot float. For example, and without limitation, the object may be permitted to float within certain coordinates, but not directly on top of an avatar and not higher than thirty meters above the ground in the virtual universe.

Flotation rules for floating transitions optionally include continual fluctuations, such as, without limitation, bobbing motion to draw attention of users to the object and to enhance the effect of the floating nature of the object. For example, and without limitation, one flotation rule specifies that the selected object will bob up and down or move vertically up and down. Another flotation rule specifies that the selected object will move horizontally side to side at a predetermined or variable distance above a surface. The horizontal motion may be continuous or sporadic. A sporadic motion refers to a motion that periodically slows or stops for a moment before resuming motion. For example, an object may float with a bobbing motion up and down from a first location to a second location, but periodically pause when at an apex at the second location, and then resume the continuous up and down motion without pausing when the object reaches the apex at the second location. This creates a sporadic or interrupted motion rather than a smooth, uninterrupted pattern of up and down motion.

In another embodiment, the flotation rule action is similar to a teleport of an object. In this case, the object is moved from a first location to a second location without depicting any motion or traveling by the object. The object disappears at the first location and reappears at the second location. For example, a region may have a number of hot spots. A hot spot is a location at which an avatar sees an object. If two users are in a room having a hot spot on each wall with a total of four hotspots, having objects on all four walls could be annoying as well as unnecessary or duplicative. Instead of presenting the object in partial obscurity to user A's right and left over user B's shoulder, the object is only displayed over user B's shoulder. Similarly, the object is only presented over user A's shoulder for viewing by user B. If both user A and user B turn to face the same direction, after a stabilization period, the object may materialize on a wall in front of the users. A quick scan around the room would verify that this newly materialized or teleported object is the only object in the room.

A particular flotation rule is implemented to control the motion or changes made to a selected object based on trigger conditions. In the example above, one trigger condition triggers the flotation rule for the vertical movement. Another trigger condition triggers the flotation rule for the horizontal motion. In another example, a trigger condition in which a group of two or more avatars are standing in a group triggers a flotation rule that modifies the selected object to float into the middle of the group and hover above the group of avatars.

A trigger condition triggers one or more motions and/or modifications to the selected object. For example, a trigger condition may trigger a flotation rule that causes the selected object to float above a fixed position. Another flotation rule may cause the selected object to turn or rotate about an axis.

A single trigger condition may initiate both the flotation rule to cause the object to float and the flotation rule that causes the object to rotate about an axis. In such a case, the selected object floats above the fixed point and rotates in the floating position. In another example, the selected object rotates and then floats. In yet another example, object floating controller 320 modifies the selected object to continuously rotate as the object is floating above the fixed position in response to the trigger condition.

If two or more flotation rules are triggered and the rules conflict with each other, object floating controller 320 uses a priority ranking associated with each flotation rule to determine which flotation rule to implement with respect to the selected object.

A trigger for a flotation rule may be any type of event or condition, such as, without limitation, an avatar unique identifier, a location of an avatar, a proximity of an avatar to one or more other avatars, a time of day, a location of the object, and/or any other conditions. In an embodiment where the trigger is an avatar, the input data used to determine whether the trigger condition has occurred includes the angle and pitch of the avatar's head and/or eyes. The angle and pitch are used to determine the optimal location and orientation of the selected object relative to the angle and pitch of the avatar's head and/or eyes. For example, if five avatars are in a huddle, the angle and pitch of their heads and/or eyes causes the object to float between the huddle, along the ground, and/or oriented up. The flotation rules take into account limitations of physics when implementing floating transitions, such as, without limitation, space constraints.

Object floating control table 308 optionally stores a priority for each flotation rule. The priority indicates which flotation rule takes priority when conditions are met for initiating more than one flotation rule. In one embodiment, the priority for the flotation rules comprises a hierarchy of rules. When multiple rule matches occur, such that two or more flotation rules have been triggered, object floating controller 320 determines which flotation rule has priority based on the priority indication and/or the flotation rules position in the hierarchy of flotation rules.

In one embodiment, the hierarchy of flotation rules is implemented by ordering the flotation rules. Application logic in object floating controller 320 is responsive to the ordering. In other words, object floating controller 320 determines which rule has priority based on the ordering of the rules.

In another embodiment, object floating control table 308 comprises a field that designates the hierarchy, such as, without limitation, by a numeric system or other designation indicating which rule has priority. For example, a rule with a higher number is given priority over a rule with a lower number.

Flotation rules table 310 is a table storing templates for flotation rules and actions for flotation rules. In this embodiment, flotation rules table 310 is a separate table than object floating control table 308. However, in another embodiment, flotation rules table 310 is included within object floating control table 308 rather than being implemented as a separate table.

Virtual universe grid software 304 is software for rendering the virtual universe. Virtual universe grid software 304 includes object based avatar tracking controller 312 and object floating controller 320. Object based avatar tracking controller 312 is software for tracking avatars within the viewable field of each selected object. Object based avatar tracking controller 312 enables virtual universe grid software 304 on server 300 to track avatars and where the avatars are looking. In other words, object based avatar tracking controller 312 can determine when an avatar is looking at a particular object and/or when an avatar is within a specified range of the object such that the avatar is able to see the object or the avatar may soon be able to see the object.

Object based avatar tracking controller 312 stores data 314 in object avatar rendering table 306. Data 312 includes, without limitation, the unique identifiers and other data describing avatars within the viewable field of one or more selected objects. When object based avatar tracking controller 312 needs information about an avatar within the range of an object from object avatar rendering table 306, object based avatar tracking controller 312 sends query 316 to object avatar rendering table 306. In response to query 316, virtual universe grid database 302 sends data 318 to virtual universe grid software 304 for utilization by object based avatar tracking controller 312. Data 318 comprises data to track avatars and implement modifications of the selected objects to improve the position and appearance of the selected objects within the virtual universe and enable improved visibility of the selected objects. Object based avatar tracking controller 312 uses data 318 and other information describing the position and location of avatars relative to one or more objects to form tracking data 322. Tracking data 322 is used for implementing geometric and texture modifications in the virtual universe, such as floating transitions.

Object floating controller 320 is software for implementing floating transitions to modify objects in a non-fixed floating manner such that the object can have greater freedom of movement to ensure greater time seen by users and improved quality of viewing by users.

Object floating controller 320 modifies a position and orientation of an object based on an occurrence of a trigger. A trigger occurs when one or more conditions are met. Object floating controller 320 determines whether one or more conditions for a trigger have occurred based on input that enables object floating controller 320 to determine a location and/or orientation of one or more avatars relative to one or more selected objects. In one embodiment, object floating controller 320 uses input, such as, without limitation, data 318 and/or tracking data 322 to determine whether conditions for a given trigger for a floating transition is satisfied.

However, object floating controller 320 is not required to utilize data from object avatar rendering table 306. Object floating controller 320 may use any data to determine optimal location and orientation according to the definition of the object owner or virtual universe grid administrator. For example, object floating controller 320 may use data conveying a list of avatar unique identifiers within a specified range of a selected object.

In this case, when data indicates one or more avatars associated with avatar unique identifiers in the list of avatar unique identifiers come within the range of the selected object, object floating controller 320 determines that a trigger has occurred. When the trigger occurs, the specified object is modified to float or otherwise alter the position and/or orientation of the selected object to increase the visibility of the selected object relative to the one or more avatars. In another embodiment, input data may include a predefined or a randomly generated path of flotation without regard to the presence of avatars within a range of the object.

FIG. 4 is a block diagram of an object avatar rendering table in accordance with an illustrative embodiment. Object avatar rendering table 400 is an example of data in an object avatar rendering table, such as object avatar rendering table 306 in FIG. 3.

Rendering UUID 402 is a primary key for object avatar rendering table 400. Object UUID 404 is a unique identifier for a selected object in a virtual universe. Object UUID 404 is a foreign key to the existing object table. Avatar UUID 406 is a foreign key to an existing avatar table. Avatar UUID 406 includes a unique identifier for each avatar in the viewable field of the object associated with object UUID 404.

Zone1EnterTime 408 is a field of a date and/or time when an avatar enters a first zone within the viewable field of an object. Zone1LeaveTime 410 is a field for a date and/or time when the avatar leaves the first zone. Zone2EnterTime 412 is a field in object avatar rendering table 400 for storing a date and/or time when an avatar enters a second zone. Zone2LeaveTime 414 is a field for storing the date and/or time when a given avatar leaves the second zone. The second zone may be an area that is outside the viewable field. In other words, the second zone is an area in which an avatar cannot see the selected object, but the area is in close proximity to the viewable field in which the avatar will be able to see the object. The second zone may be referred to as a detection zone or detection area.

Zone1EnterTime 408, Zone1LeaveTime 410, Zone2EnterTime 412, and Zone2LeaveTime 414 are shown as a coordinated universal time (UTC), such as zulu or Greenwich Mean Time (GMT). However, these fields are not limited to using UTC date and/or time. The date and/or time when avatars enter a zone or leave a zone may also be provided using a data and/or time from any type of calendaring system and/or any time zone.

When an avatar enters the second zone, the object avatar tracking controller software may begin preparing to display the object to the avatar when the avatar does eventually enter the viewable field. In addition, when one or more avatars enters or exits either the first zone or the second zone, the object floating controller may use the information describing the avatars' positions in the first and second zone to determine whether to initiate a floating action and/or whether to discontinue a floating action of the object.

NumberofZone1Enters 416 is a field for storing the number of times a particular avatar has entered the first zone. This information may be useful to determine whether the user has never viewed the object and, therefore, content associated with an object should be displayed in full to the user associated with the avatar. Information regarding the number of times an avatar has entered the range of the object may also be used to determine which modifications of the object should be implemented. For example, an object modification may include, without limitation, floating the object above a surface in the virtual universe.

The information in NumberofZone1Enters 416 is also used to determine whether the user has viewed the object one or more times in the past, and therefore, the content associated with the object should be displayed in part, skip introductory material, be modified or abbreviated, or otherwise altered so that the exact same content is not displayed to the user every time the user is within the viewable field of the object.

NumberofZone2Enters 418 is a field for storing the number of times an avatar has entered the second zone. LastCoordinates 420 is a field for storing the coordinate data describing where a given avatar is within the first zone or the second zone of a selected object. The coordinate data is typically given in xyz type coordinate data. In other words, the coordinate data includes data for the x axis, the y axis, and the z axis.

FIG. 5 is a block diagram of an object floating control table in accordance with an illustrative embodiment. Object floating control table 500 is a table storing flotation rules, such as object floating control table 308 in FIG. 3.

Object floating control table 500 stores object UUID 502 for each selected object. Object floating control table 500 may include multiple fields with object UUIDs for selected objects.

Object floating control table 500 also includes a field for each flotation rule with a flotation rule unique identifier identifying the rule, such as flotation rule UUID 504. Flotation rule UUID 504 is an example of a field in object floating control table 500 for storing flotation rules associated with each object. Object floating control table 500 may include multiple flotation rules for each selected object. A flotation rule is implemented to modify a selected object associated with the flotation rule when one or more conditions associated with the flotation rule are met.

FlotationRulePriority 506 is a field in object floating control table 500 that designates the priority and/or hierarchy of a given flotation rule. Each flotation rule in object floating control table 500 has an associated priority and/or hierarchy in FlotationRulePriority 506. When two or more flotation rules are triggered, the object floating controller uses the priority and/or hierarchy of each triggered flotation rule to determine which flotation rules are implemented and which flotation rules are not implemented.

Some flotation rules can be implemented together. For example, a flotation rule to float an object and rotate an object can be implemented together. Other flotation rules conflict and are not implemented together. For example, a flotation rule to bounce an object up and down vertically conflicts with a flotation rule that moves the object horizontally.

These flotation rules are implemented separately, such as one after the other. In another example, a higher priority flotation rule is implemented rather than a conflicting lower priority flotation rule.

In one embodiment, the priorities in object floating control table 500 are associated with a weighting, such as, without limitation, a weighting on a scale or a weighting based individually specified trigger conditions. These weighted trigger conditions may be referred to as priority triggers. For example, a trigger associated with an avatar coming within a viewable field of the selected object for the first time is given greater weight than a trigger associated with a time of day or a trigger associated with a different avatar coming within the viewable field of the selected object for the third time. Thus, a condition in which an avatar is viewing an object for the first time is a priority trigger over that of a condition associated with an avatar that is a repeat viewer of the object.

In addition, in another embodiment, the priorities include a set of absolute priorities. The set of absolute priorities is a set of one or more absolute priorities. An absolute priority takes precedence over all other priorities. For example, an absolute priority may state that any time a trigger associated with an avatar viewing the selected object for the first time occurs, that trigger trumps all other triggers.

In the event multiple flotation rules are triggered for a given object with the same priority, the rules are executed using any type of logic for determining which rule in the set of rules having the same priority will be executed. For example, and without limitation, rules with the same priority are executed sequentially based on the order of the rules in the database or the unique identifier of the rules in object floating control table 500. In another example, the rules with the same priority are implemented randomly or alphabetically. The order in which rules having the same priority are implemented may be determined on the fly based on trigger priority, priority of avatars within the range of the selected object, crowd density, number of avatars within range of the selected object, the presence of obstructing objects, the presence of objects associated with a competitor, and/or the number of times the avatars have viewed the object.

Figure 6:
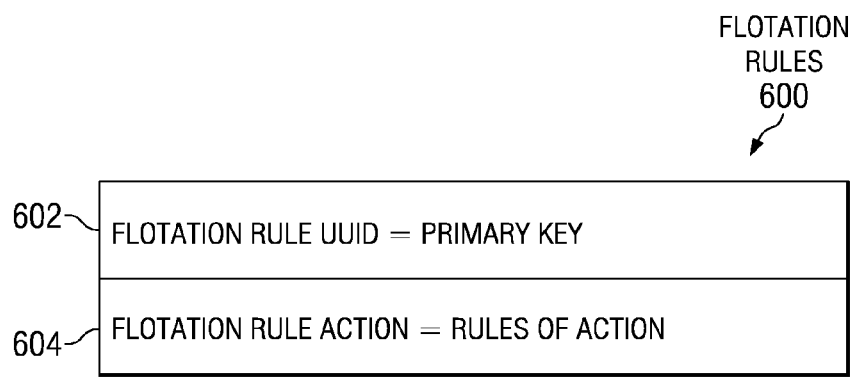
FIG. 6 is a block diagram of a flotation rules table in accordance with an illustrative embodiment.

FIG. 6 is a block diagram of a flotation rules table in accordance with an illustrative embodiment. Flotation rules 600 is a table for storing templates for flotation rules, such as flotation rules table 310 in FIG. 3. FlotationRuleUUID 602 is a field for storing a unique identifier for a flotation rule template. Flotation rules table 600 may include multiple fields for storing multiple flotation rule templates.

FlotationRuleAction 604 is a template for storing the rules of the action associated with a given flotation rule. Each flotation rule in flotation rules table 600 is associated with rules of action. The rules of action include, without limitation, boundary coordinates, maximum speed of flotation or movement, rate of speed change, such as acceleration and/or deceleration, positional limits, angular limits, and/or movement effects, such as straight from point A to point X, curved from point A to point B to point Z, and so forth.

Figure 7:
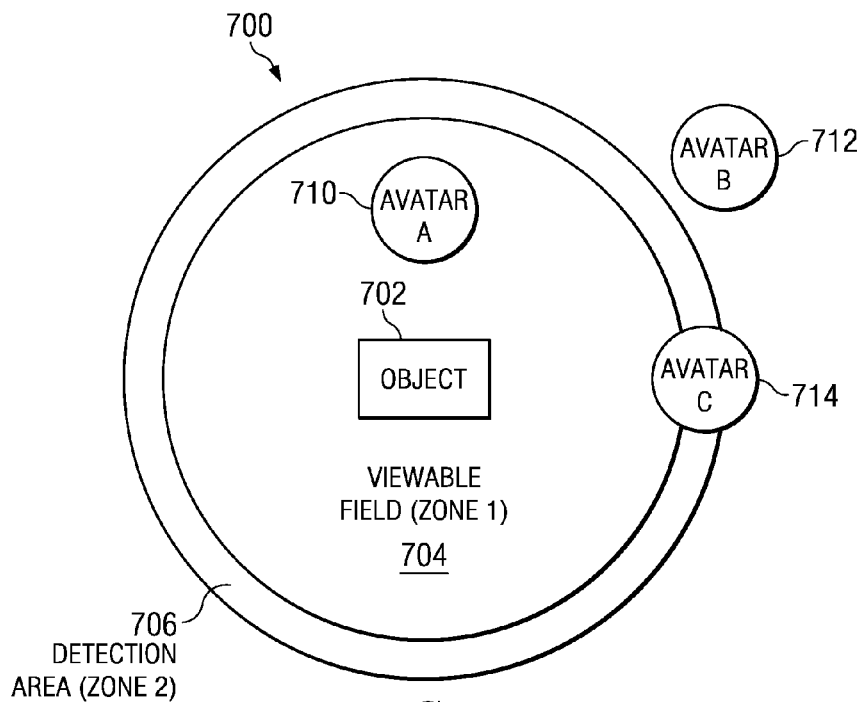
FIG. 7 is a block diagram of a viewable area for an object in accordance with an illustrative embodiment.

FIG. 7 is a block diagram of a viewable area for an object in accordance with an illustrative embodiment. Range 700 is defined with respect to object 702. Object 702 is an element in a virtual universe that is not directly controlled by a user or associated with a user's account. An object may be, for example, buildings, statues, billboards, signs, and advertisements in the virtual universe. In this example, object 702 is an advertisement, such as a billboard or a sign. Range 700 is an area associated with the viewing of object 702. Range 700 includes viewable field 704 and detection area 706 associated with object 702 in a virtual universe.

Viewable field 704 is an area in a given proximity of object 702. Viewable field 704 has a focal point or center at a location that is the same as the location of object 702. Viewable field 704 may also be referred to as zone 1 or a first zone. An avatar in viewable field 704 is able to see or view object 702 and/or content associated with object 702. For example, object 702 may be associated with video and/or audio content. Object 702 may have some movement associated with the object. For example, object 702 may be capable of some limited movement or animation. However, object 702 is substantially limited to a single location in the virtual universe.

Detection area 706 is an area adjacent to viewable field 704 within range 700. Detection area 706 may also be referred to as a second zone or zone 2. An avatar in detection area 706 cannot see object 702 or view content associated with object 702. However, when an avatar enters detection area 706, the object avatar tracking controller software can begin preparing to display object 702 and content associated with object 702 to the avatar when the avatar enters viewable field 704.

In this example, avatar A 710 is within viewable field 704. Therefore, avatar A 710 is able to view or see object 702. Avatar B 712 is not able to see or view object 702. In addition, avatar B 712 is not close enough to viewable field 704 to indicate that avatar B 712 may be preparing to enter viewable field 704. Avatar C 714 is within detection area 706. Avatar C 714 is not able to see or view object 702. However, the presence of avatar C 714 indicates that avatar C 714 may be about to enter viewable field 704 or that avatar C 714 has just left viewable field 704. Avatar A 712 is outside range 700. Therefore, an object avatar tracking table for object 702 includes entries for avatar A 710 in zone 1 and avatar C 714 in zone 2. However, the object avatar tracking table will not include data or records for avatar B 712 because avatar B 712 is outside both viewable field 704 and detection area 706.

Objects are prevalent in virtual universes. The illustrative embodiments recognize that objects in a particular user's viewable field may be obstructed from view by one or more other objects such that a user cannot see the object because of the obstruction. In such cases, the focal point of the viewable area for an object may be set at a location other than the location of the object.

Figure 8:
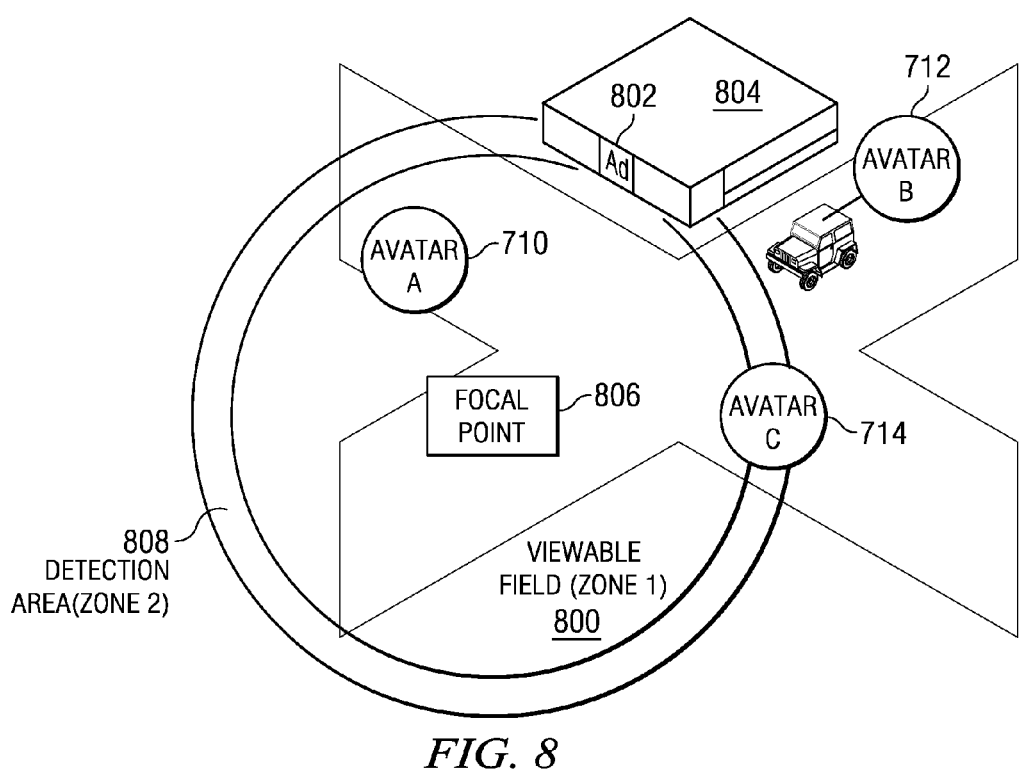
FIG. 8 is a block diagram of a viewable area for an object having a focal point at a location other then the location of the object in accordance with an illustrative embodiment.

FIG. 8 is a block diagram of a viewable area for an object having a focal point at a location other than the location of the object in accordance with an illustrative embodiment. Viewable field 800 is a viewable field for object 802. In this example, object 802 is an advertisement in front of object 804. Viewable field 800 is a range in which an avatar, such as avatar A 710, avatar B 712, and avatar C 714 can see object 802.

Viewable field 800 has focal point 806. Focal point 806 is a point from which the range, or area, of viewable field 800 for an object is determined. In other words, viewable field 800 is an area that is identified based on a predetermined radius or distance from focal point 806. Here, focal point 806 is a location that is different than the location of object 802 because object 802 is adjacent to an obstructing object, such as object 804.

In this example, when avatar C 714 comes in range of detection area 808 of object 802, object based avatar tracking controller, such as object based avatar tracking controller 312 in FIG. 3, makes a determination as to whether there is an existing session associated with the unique identifier of object 802 and the unique identifier of avatar C 714. This step may be implemented by making a query to the object avatar rendering table to determine if avatar C 714 has ever entered zone 2 or zone 1 previously. If there is not an existing session for avatar C 714, the object based avatar tracking controller creates a record in the object avatar rendering table with the unique identifier of object 802 and the unique identifier of avatar C 714.

The record in the object avatar rendering table may optionally include additional information, such as, without limitation, a date and time when avatar C 714 entered zone 2, a date and time when avatar C 714 leaves zone 2, a date and time when avatar C 714 enters zone 1, a number of zone 2 enters, a number of zone 1 enters, coordinates of avatar C 714, and any other data describing avatar C 714. This data is used by the virtual universe grid software for analysis, reporting, and billing purposes.

Object 802 may have an initiation process associated with object 802. For example, if object 802 is an advertisement with an audio and video content associated with viewing object 802, an initiation process may include buffering the audio and/or video content, checking a cache for the audio and/or video content, caching the audio and/or video content, or any other initiation process.

In another embodiment, the initiation process may include sending messages to an object floating controller, such as object floating controller 320 in FIG. 3. The message may notify the object floating controller to retrieve tracking data, such as tracking data 322 in FIG. 3, because an avatar is in range of object 802.

When avatar C 714 enters viewable field 800, an object based avatar tracking controller may trigger any object initiation process defined by object 802. For example, when avatar C 714 enters viewable field (zone 1) 800, the object based avatar tracking controller may display the buffered or cached content. If a user is viewing the object for the first time and object 802 has a video or audio file associated with viewing the object, the process starts playing the video or audio from the beginning.

In another embodiment, an object floating controller, such as object floating controller 320 in FIG. 3, queries an object floating control table, such as object floating control table 500 in FIG. 5, when avatar C 714 enters detection area 808.

If a session already exists, the object based avatar tracking controller triggers any object re-initiation process defined by the object. For example, if the user is not viewing an object with an associated video for the first time, the process starts playing the video at a point in the video after the beginning, such as after an introduction, in a middle part, or near the end of the video to avoid replaying introductory material.

The object based avatar tracking controller makes a determination as to whether the position of avatar C 714 has changed. Changing position may include traveling, turning, walking, or disappearing, such as teleporting, logging off, or disconnecting. When the position of avatar C 514 changes, the object based avatar tracking controller adds the user position data to the object avatar rendering table, such as at a field for last coordinates 420 in FIG. 4. The user position data includes angle of view coordinate data of the avatar relative to object 802 and the distance of avatar C 714 to object 802.

The floating object controller may then modify object 802 according to the flotation rules in the object floating control table, such as object floating control table 500 in FIG. 5. The modification of object 802 is capable of improving the visibility of object 802 to an avatar in viewable field 800.

When avatar C 714 is out of range of viewable field 800 and detection area 808, the object based avatar tracking controller logs a session pause for the session associated with avatar C 714. The log may include the date and time of the session pause. When the session has been paused for an amount of time that exceeds a threshold amount of time, the object based avatar tracking controller terminates the session associated with avatar C 714. The process termination may include, without limitation, removing the records and data associated with avatar C 714 from the object avatar rendering table. If the record is not deleted, when avatar C 714 comes back into range of zone 1 or zone 2 of object 802, the object based avatar tracking controller determines that an existing session associated with the unique identifier of object 802 and a unique identifier of avatar C 714 already exist. In such a case, a new record for avatar C 714 will not be created. Instead, the data in the object based avatar rendering table will be updated with new data regarding avatar C 714 in the range of object 802.

Figure 9:
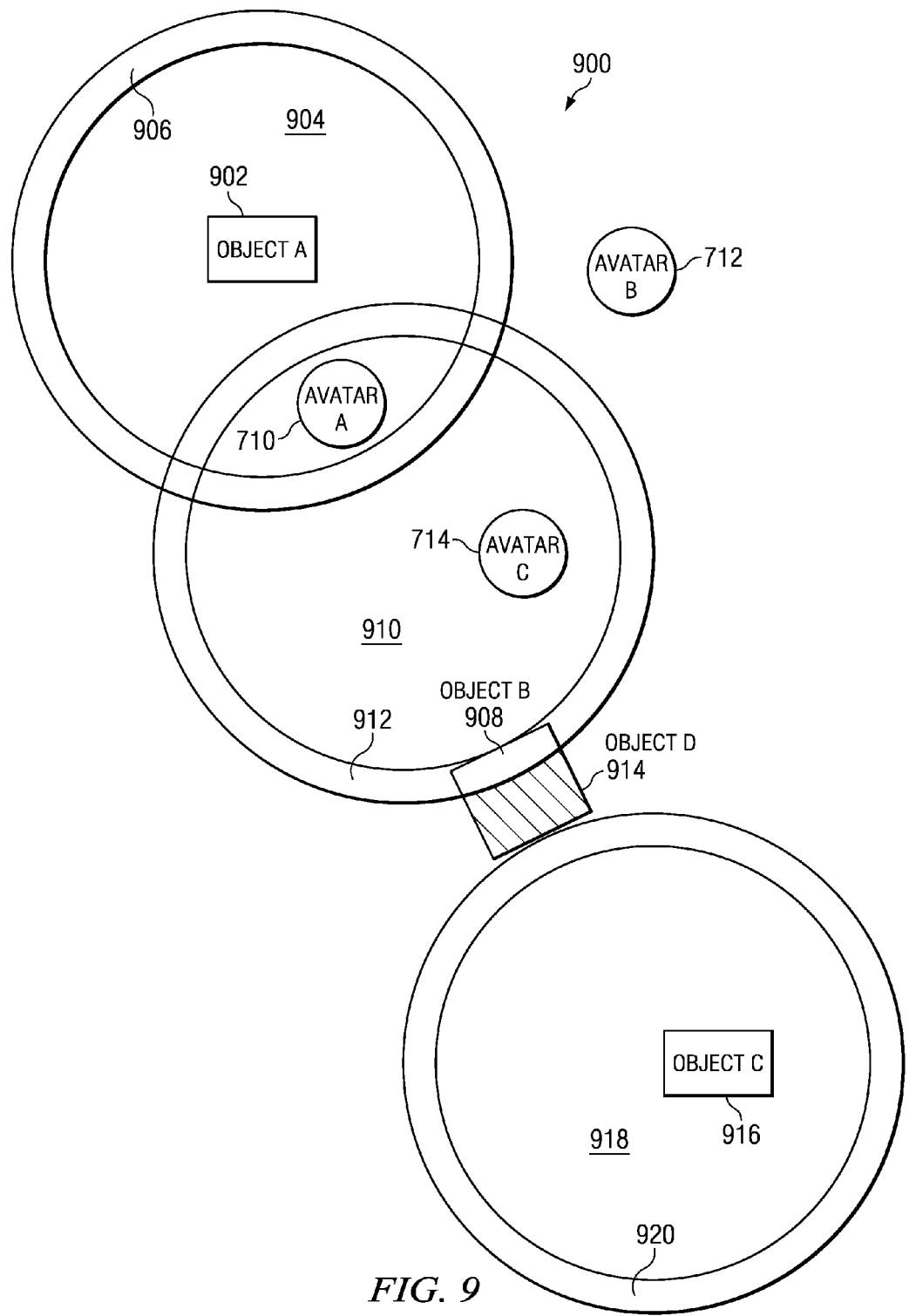
FIG. 9 is a block diagram of viewable areas for a plurality of objects in accordance with an illustrative embodiment.

FIG. 9 is a block diagram of viewable areas for a plurality of objects in accordance with an illustrative embodiment. Region 900 is a region in a virtual universe. Region 900 is associated with a server, such as server 104 in FIG. 1. Each region in a virtual universe is typically supported by a different server.

Object 902 is associated with viewable field (zone 1) 904. Object 902 may also optionally have a detection area (zone 2) 906. Viewable field (zone 1) 910 is a viewable area associated with object B 908. Object B 908 may also have detection area (zone 2) 912. In this example, viewable field 910 overlaps in part with a portion of viewable field 904. Viewable field 910 has a focal point at a location other than the location of object B 908 because object D 914 is an obstructing object to object B 908. Object B 908 may also have detection area (zone 2) 912. In this example, viewable field 910 overlaps in part with a portion of viewable field 904. Object C 916 is associated with viewable field 918. Object C 916 is optionally associated with detection area (zone 2) 920.

In this example, avatar A 710 is within viewable field 904 of object A 902 and viewable field 910 of object B 908. In other words, avatar A 710 can see object A 902 or object B 908. Avatar C 714 is within viewable field 910 of object B 908. Avatar C 714 is able to see or view object B 908. Avatar B 712 is outside the viewable fields of objects 902, 908, 914, and 916.

FIG. 10 is a block diagram of an object based avatar table for a plurality of objects in accordance with an illustrative embodiment. Object based avatar table 1000 is an object based avatar table for a plurality of selected objects. In this example, object based avatar table 1000 includes a unique identifier for selected object A 1002 and object B 1020. Data describing avatars for each selected object are also included.

For example, object based avatar table 1000 includes avatar A UUID 1004, avatar A zone 1 enter time 1006, avatar A zone 2 enter time 1008, avatar A zone 1 leave time 1010, and avatar A zone 2 leave time 1012. Object based avatar table 1000 includes data regarding avatars associated with zone 1 and zone 2 of object B 1020. For example, and without limitation, object based avatar table 1000 includes avatar A UUID 1022, avatar A zone 1 enter time 1024, avatar A zone 2 enter time 1026, avatar A zone 1 leave time 1028, avatar A zone 2 leave time 1030, avatar C UUID 1032, avatar C zone 1 enter time 1034, avatar C zone 2 enter time 1036, avatar C zone 1 leave time 1038, and avatar C zone 2 leave time 1040.

The fields and data shown in object based avatar table 1000 are only examples of fields and data that may be included in an object based avatar table. However, implementations of object based avatar tables are not limited to only including the data and/or fields shown in FIG. 10. An object based avatar table may include additional data and/or additional fields not shown in FIG. 10.

In addition, object based avatar table 1000 in this example only includes data and fields for two objects and two different avatars. However, an object based avatar table may include fields and/or data for any number of objects and any number of avatars. In other words, object based avatar table 1000 may include fields and/or data for a single object, as well as two or more objects. Likewise, object based avatar table 1000 may include fields and/or data for tracking a single avatar associated with each object, as well as two or more avatars associated with each object's viewable field and/or detection area.

Figure 11:
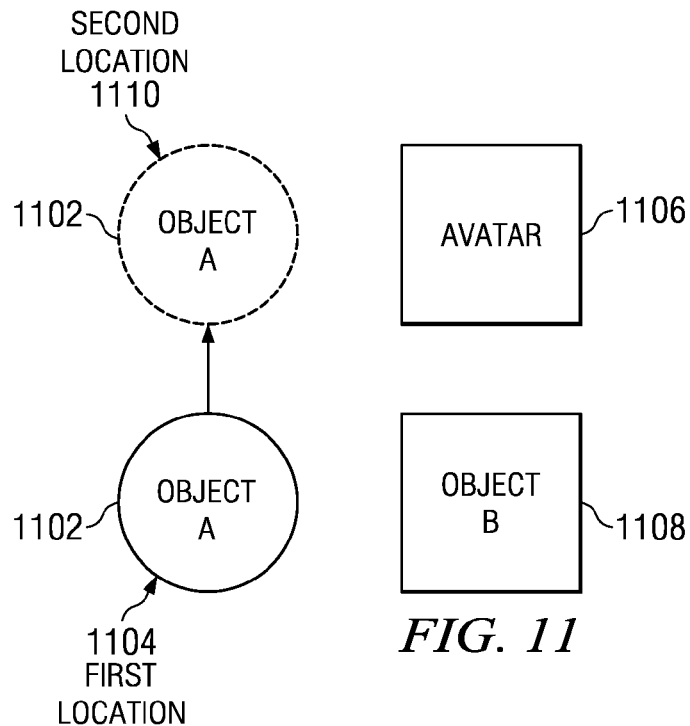
FIG. 11 is a block diagram of a floating object in accordance with an illustrative embodiment.

FIG. 11 is a block diagram of a floating object in accordance with an illustrative embodiment. Object A 1102 is a selected object. A unique identifier for object A 1102 is included in an object floating control table, such as object floating control table 308 in FIG. 3 and object floating control table 500 in FIG. 5.

When object A 1102 is in first location 1104, object A 1102 is obscured from view by a user associated with avatar 1106 due to obscuring object B 1108. When a trigger event occurs, such as, without limitation, avatar 1106 entering a field of view of object A 1102, an object floating controller initiates a floating transition of object A 1102. The floating transition may include, without limitation, floating object A 1102 above a surface, tilting or reorienting object A 1102, teleporting or relocating object A 1102 to a different location, moving object A 1102 along a random route, moving object A 1102 in a bobbing motion, moving object A 1102 in a zig zag or side to side motion, turning object A 1102 forty-five degrees, turning object A 1102 ninety degrees, and/or turning object A 1102 one hundred and eighty degrees, and/or any other floating transitions.

In this example, the floating rules move object A 1102 up and down from first location 1104 to second location 1110. Object A 1102 transitions from first location 1104 to floating above a surface at location 1110 repeatedly or cyclically to attract the attention of avatar 1106 and/or increase the ability of the user associated with avatar 1106 to view object A 1102.

Figure 12:
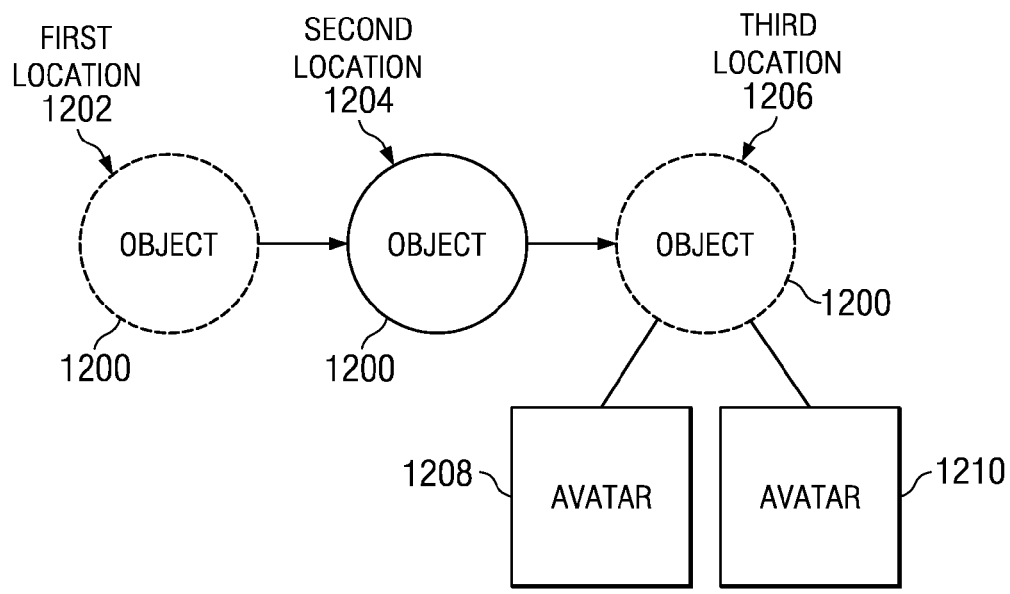
FIG. 12 is a block diagram of another floating object in accordance with an illustrative embodiment.

FIG. 12 is a block diagram of another floating object in accordance with an illustrative embodiment. Object 1200 is a selected object. Object 1200 is floating in accordance with flotation rules associated with object 1200. The flotation rules are stored in an object floating control table, such as object floating control table 308 in FIG. 3. A floating object controller uses the flotation rules to determine when and where object 1200 is able to float.

In this example, floating object controller moves object 1200 from first location 1202 along a floating path to second location 1204 and then to third location 1206. The path from first location 1202 to second location 1204 and third location 1206 is a random path within a specified range that is determined based on flotation rules, constraints, and limitations in the object floating control table. In other words, floating object 1200 moves randomly around a specified area, a given distance above a surface, such as the ground in the virtual universe, for a specified amount of time. Floating object 1200 increases the visibility of object 1200 to avatars within a range of object 1200, such as avatar 1208 and 1210.

Figure 13:
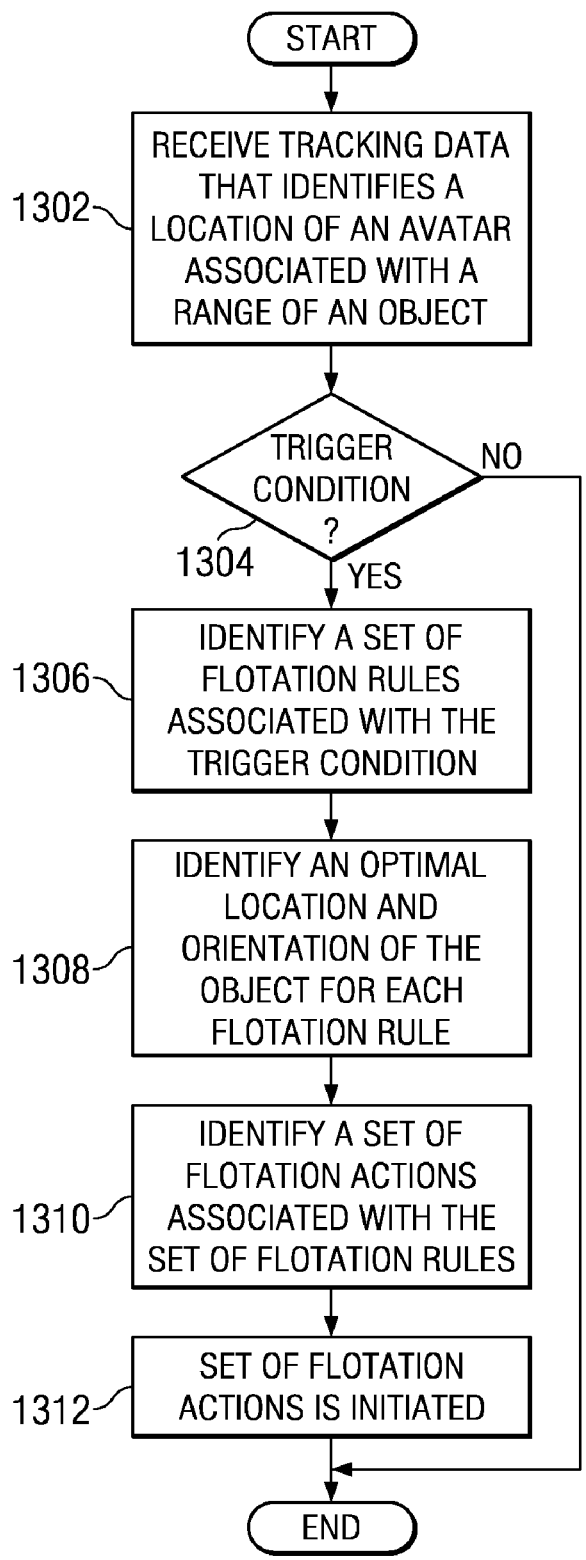
FIG. 13 is a flowchart illustrating a process for floating transitions in accordance with an illustrative embodiment.

FIG. 13 is a flowchart illustrating a process for floating an object in accordance with an illustrative embodiment. The process is implemented by object floating controller 320 in FIG. 3.

The process begins by receiving tracking data that identifies a location of an avatar associated with a range of an object in a virtual universe (step 1302). The process makes a determination as to whether the tracking data indicates an occurrence of a trigger condition (step 1304). If a trigger condition does not occur, the process terminates thereafter.

Returning to step 1304, if the trigger condition does occur, the process identifies a set of flotation rules associated with the trigger condition (step 1306). The process identifies an optimal location and orientation of the object for each flotation action in a set of flotation actions associated with the set of flotation rules (step 1308). The process identifies a set of flotation actions associated with the set of flotation rules (step 1310). The set of flotation actions is initiated (step 1312) with the process terminating thereafter. The location and orientation of the object is modified in accordance with the set of flotation actions associated with the set of flotation rules.

Figure 14:
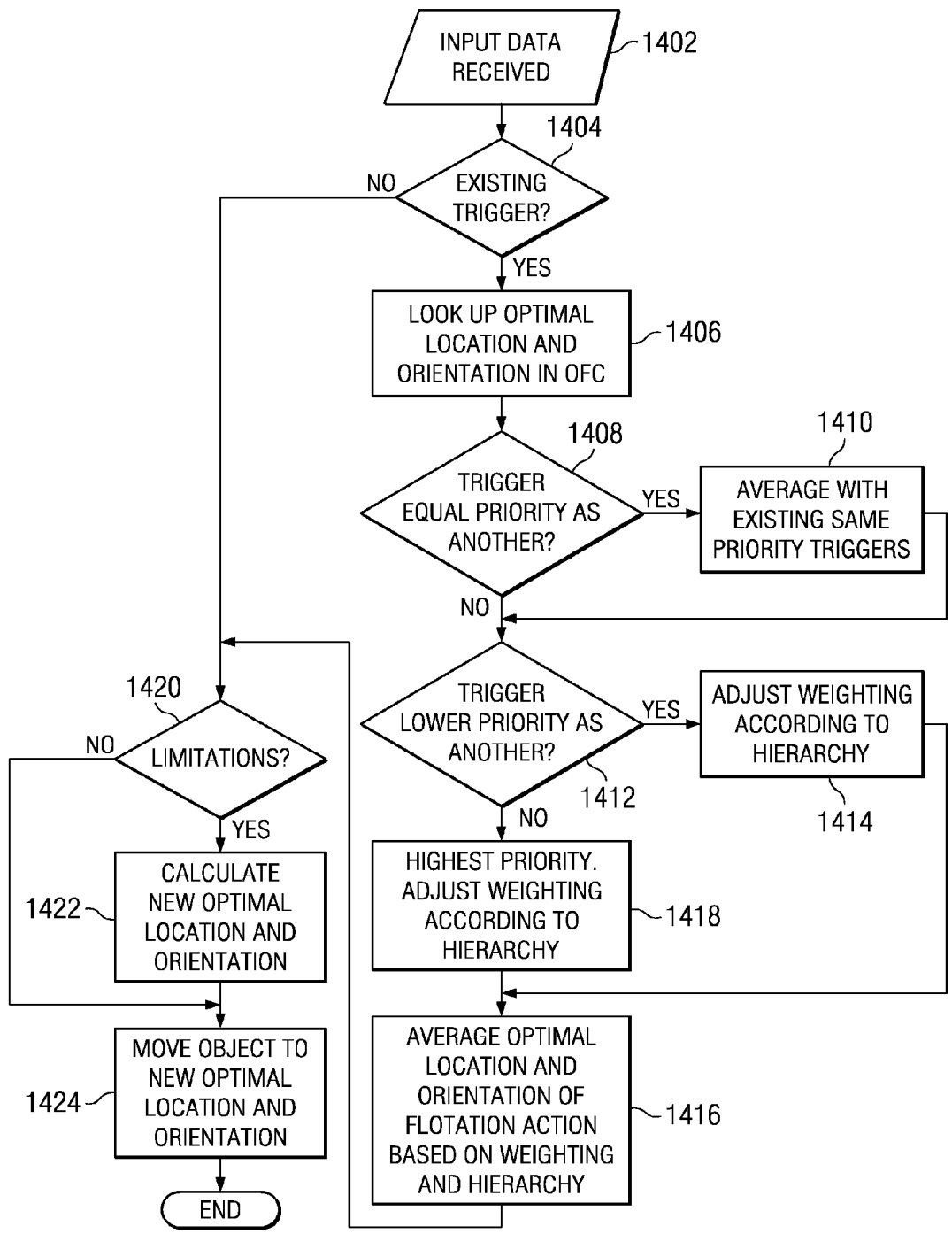
FIG. 14 is a flowchart illustrating a process for floating transitions in accordance with an illustrative embodiment.

FIG. 14 is a flowchart illustrating a process for floating transitions in accordance with an illustrative embodiment. The process is implemented by object floating controller 320 in FIG. 3.

The process begins by receiving input data (step 1402). The input data is used to determine if a predefined trigger condition has occurred. Input data includes, without limitation, data received from one or more object avatar rending table records. The process makes a determination as to whether a new trigger condition exists (step 1404) based on the input data. For example, and without limitation, the input data may be analyzed to determine whether a second avatar has come within the viewable field of the object or whether a fiftieth avatar has come within the viewable field of the object. In another example, a determination can be made as to whether an avatar has left the viewable field of the object.

If there is an existing flotation trigger condition in effect that is a new trigger condition, the process calculates an optimal location and orientation for the object based on data in the object floating control table (step 1406). The process makes a determination as to whether the new trigger condition has a same priority as any pre-existing triggers (step 1408). If yes at step 1408, the process averages the optimal location and orientation of the flotation action among the trigger conditions having the same priority (step 1410).

Returning to step 1408, if no pre-existing triggers have the same priority, the process makes a determination as to whether the new trigger condition has a lower priority than any pre-existing trigger condition priorities (step 1412). If the new trigger condition has a lower priority at step 1412, the process places the new trigger condition in a hierarchy of triggers according to the priority of the trigger conditions and adjusts the weighting of each trigger condition according to the hierarchy (step 1414). In this step, the new trigger condition is weighted with a lesser weighting relative to the condition triggers having a higher priority. In other words, the trigger conditions are weighted according to the priorities, with a trigger condition being given a greater weighting and trigger conditions with a lower priority being given a lesser weighting.

The process weights each trigger condition according to the priorities and hierarchy. The process averages the optimal location and orientation of the flotation action of the object based on a weighting of the optimal location and orientation of the trigger conditions based on the priorities (step 1416).

Returning to step 1412, if the new trigger condition does not have a lower priority then pre-existing trigger conditions, the process places the new trigger condition in a position at the top of the hierarchy of trigger conditions and adjusts the weighting of each trigger condition according to the hierarchy, in which the new trigger condition is given the highest priority among the pre-existing triggers (step 1418). The process averages the optimal location and orientation of the flotation action for the object based on the weighting and hierarchy (step 1416). In this case, the new trigger condition has a higher weighting relative to the other triggers having lower priorities.

Returning now to step 1404, the process makes a determination as to whether there are any limitations to the calculated optimal location and orientation (step 1420). For example, and without limitation, the process determines if the optimal location is outside a predefined boundary coordinates for the object. If yes at step 1420, the process calculates a new optimal location and orientation according to the limitation (step 1422). For example, and without limitation, the process calculates a new optimal location and orientation at the edge coordinate or edge angle at which the location would go beyond the limitation.

Returning to step 1420, if there are no limitations to the orientation and location, the process moves the flotation of the object to the calculated optimal location and orientation (step 1424) with the process terminating thereafter.

In another embodiment, when the object is moving from a first location and orientation to a second location and orientation, the object is animated according to a predefined speed so that users can view the contents of the object while the object is in flight. In this example, the process allows for the object to be moved from a first location and orientation to a second location and orientation along curved, nonlinear paths, such that other objects or obstructions between the first location and the second location can be avoided, circumnavigated, skirted, or minimized to permit users to view the content of the object as the object is being moved from the first location to the second location with no obstructions or minimized obstruction of the view of the object by one or more users.

Figure 15:
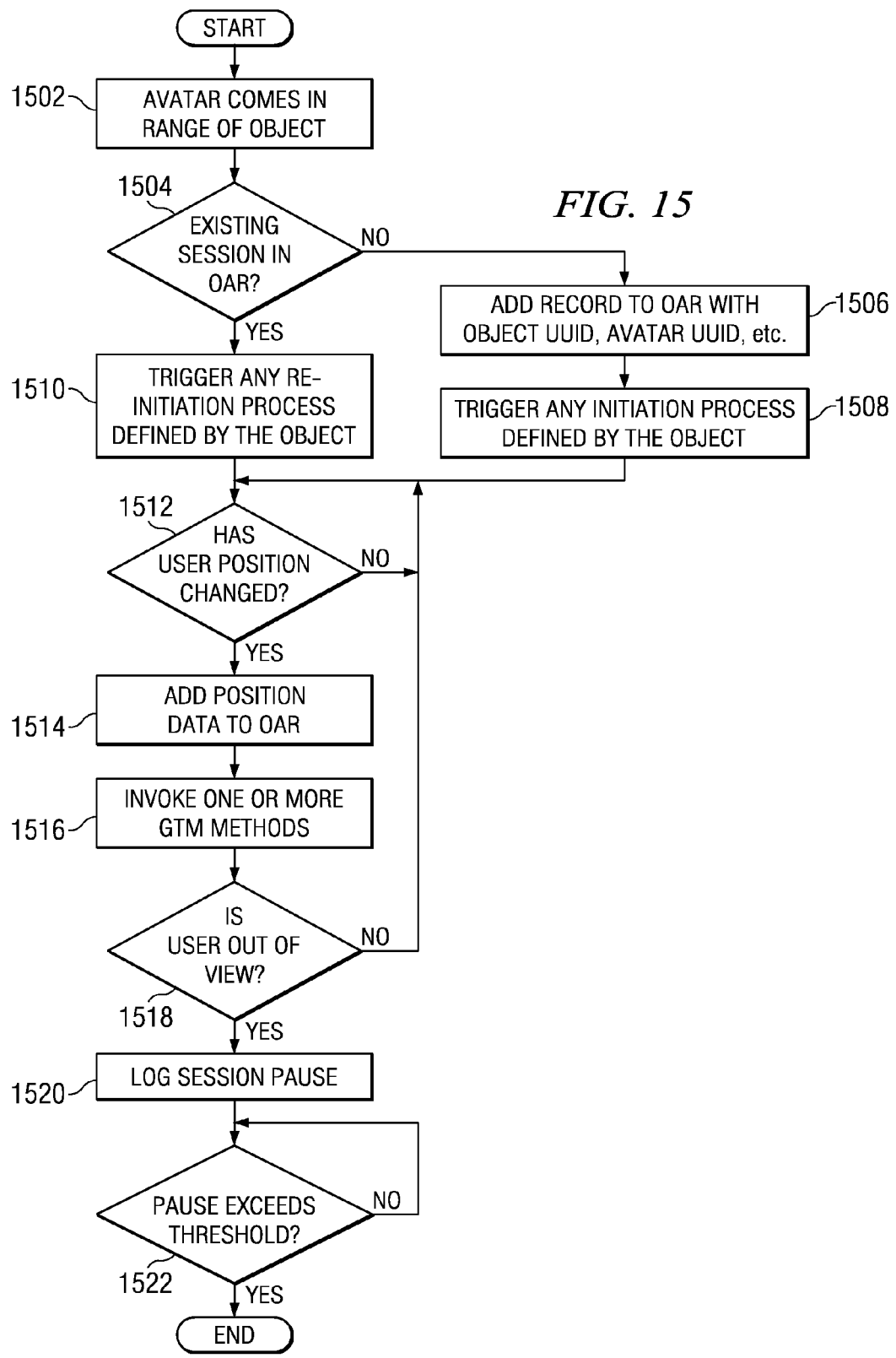
FIG. 15 is a flowchart illustrating a process for object based avatar tracking using object avatar rendering tables in accordance with an illustrative embodiment.

FIG. 15 is a flowchart illustrating a process for object based avatar tracking using object avatar rendering tables in accordance with an illustrative embodiment. The process in FIG. 15 is implemented by software for tracking avatars in a range of an object, such as object based avatar tracking controller 312 in FIG. 3. The process in FIG. 15 is a more detailed description of step 1402 in FIG. 14.

The process begins when an avatar comes in range of the object (step 1502). A determination is made as to whether there is an existing session associated with the unique identifier of the object and the unique identifier of the avatar (step 1504). This step may be implemented by making a query to the object avatar rendering table for the object. If there is not an existing session, the process creates a record in the object avatar rendering table with the unique identifier of the object and the unique identifier of the avatar (step 1506). The record in the object avatar rendering table may include other information, such as, without limitation, a date and time, which can be used for analysis, reporting, and billing purposes.

The process triggers any object initiation process defined by the object (step 1508). For example, if a user is viewing the object for the first time and the object has a video associated with viewing the object, the process starts playing the video from the beginning.

Returning to step 1504, if a session already exists, the process triggers any object re-initiation process defined by the object (step 1510). For example, if the user is not viewing an object with an associated video for the first time, the process starts playing the video at a point in the video after the beginning, such as after an introduction, in a middle part, or near the end of the video to avoid replaying introductory material.

After triggering any initiation process at step 1508 or triggering any re-initiation process at step 1510, the process makes a determination as to whether the user's position has changed (step 1512). Changing position may include traveling, turning, or disappearing, such as teleporting, logging off, or disconnecting. If the user's position has not changed, the process returns to step 1512. The process may return to step 1512 if the user's position does not change within a specified amount of time. The specified amount of time may be configured by the virtual universe grid administrator or object owner. The specified amount of time may occur very frequently, such as, without limitation, after a specified number of seconds or after a specified number of milliseconds.

When the user's position changes at step 1512, the process adds the user position data to the object avatar rendering table (step 1514). The user position data includes angle of view coordinate data of the avatar relative to the object and distance of the avatar to the object. The process then performs an analysis of the position data and modifies the object according to one or more geometric and texture modification methods (GTMs) (step 1516) to improve visibility of the object.

The process then makes a determination as to whether the user is out of view (step 1518). The user may be out of view if the user or the user's avatar has disappeared or is no longer facing the object. If the user is not out of view, after a specified amount of time the process returns to step 1512. The specified amount of time may be configured by the virtual universe grid administrator or object owner. The specified amount of time may be, without limitation, a specified number of seconds or a specified number of milliseconds.

If the user is out of view at step 1518, the process logs a session pause (step 1520). The log may include the date and time. Next, the process makes a determination as to whether the session has been paused for an amount of time that exceeds a threshold amount of time (step 1522). The threshold amount of time may be configured by a virtual universe administrator or object owner. If the pause does not exceed the threshold, the process returns to step 1522. When the pause exceeds the threshold, the process terminates thereafter.

The process termination may include, without limitation, removing the records of the avatar from the object avatar rendering table. If the record is not deleted, when the avatar comes back into range of the object at step 1502, the process will make a determination at step 1504 that an existing session associated with the unique identifier of the object and a unique identifier of the avatar already exist.

Thus, the illustrative embodiments provide a computer implemented method and apparatus for floating object transitions. In one embodiment, tracking data identifying a location of an avatar in relation to a range of an object in a virtual universe is received. The range comprises a viewable field. In response to the tracking data indicating an occurrence of a trigger condition, a set of flotation rules associated with the trigger condition is identified. An optimal location and orientation of the object is identified for each flotation action in a set of flotation actions associated with the set of flotation rules. The set of flotation actions are initiated. The object changes the location and orientation of the object in accordance with the set of flotation actions associated with the set of flotation rules.

The object based avatar tracking determines viewable areas for an avatar within the vicinity of a designated object. Rather than analyzing data sent to each virtual universe client, as in the prior art, the object based avatar tracking treats an object as if it were a virtual client. In other words, the object is given a viewable field and treated as if the object were an avatar with eyes capable of viewing avatars in the viewable field. This not only reduces the amount of data processing as compared to prior art method for managing objects, but this method also allows for more complex and dynamic rendering of objects. For example, the object tracking is used to dynamically alter the position and appearance of objects within a virtual universe to enable maximum visibility of the designated object.

Thus, the object based avatar tracking makes it possible to increase the visibility of objects for the maximum number of users, in terms of overall time seen and quality of viewing. The object based avatar tracking also increases the value of objects within a virtual universe because the visibility of these objects is improved.

The floating transitions float designated objects within specified coordinate ranges to be optimally positioned for improved avatar visibility. Objects are modified to move in a non-fixed floating manner, such that the object can have greater freedom of movement to ensure greater time seen by users and improved quality of viewing by users. Objects can determine their optimal location and orientation at any moment and shift locations accordingly. Moreover, because objects in the virtual universe are three dimensional representations, the objects are not constrained by real world physics and other limitations that would make implementation of floating objects expensive to achieve.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable data storage medium providing program code for use by or in connection with a computer or any instruction execution system. For the purposes of this description, a computer-usable or computer readable data storage medium can be any tangible apparatus that can store the program for use by or in connection with the instruction execution system, apparatus, or device.

The medium can be an electronic, magnetic, optical, or semiconductor system (or apparatus or device). Examples of a computer-readable data storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for floating object transitions, the method comprising the steps of:
    a computer receiving tracking data that identifies a location of an avatar associated with a range of an object in a virtual universe, wherein the range comprises a viewable field;
    responsive to the tracking data indicating an occurrence of a trigger condition, the computer identifying a set of flotation rules associated with the trigger condition, wherein the trigger condition is a most recent trigger condition in a plurality of existing trigger conditions;
    the computer identifying an optimal location and orientation of the object for each flotation action in a first set of flotation actions associated with the set of flotation rules;
    the computer initiating the first set of flotation actions to float the object above a surface, wherein the location and orientation of the object is modified in accordance with the first set of flotation actions associated with the set of flotation rules; and
    responsive to the most recent trigger condition having a higher priority than the plurality of existing trigger conditions, averaging, using the computer, an optimal location and orientation of a second set of flotation actions associated with the plurality of existing trigger conditions, wherein the location and orientation associated with the most recent trigger condition is given a higher weighting than other trigger conditions in the plurality of existing trigger conditions.

2. The method of claim 1 further comprising:
    the computer including, in the set of flotation rules, two or more flotation rules;
    the computer retrieving a priority for each one of the two or more flotation rules from an object floating control table; and
    the computer initiating a third set of flotation actions associated with a highest priority flotation rule in the set of flotation rules having the highest priority, wherein the object changes location and orientation in accordance with flotation actions that are associated with the highest priority flotation rule.

3. The method of claim 1 further comprising the steps of:
    the computer identifying constraints associated with the first set of flotation actions, wherein the location and orientation of the object is modified in accordance with the constraints.

4. The method of claim 1 further comprising the steps of:
    the computer including, in the trigger, two or more trigger conditions;
    the computer retrieving a weighting for each trigger condition from an object floating control table;
    the computer identifying a higher priority trigger condition using the weighting for each trigger condition; and
    the computer identifying a particular set of flotation rules that are associated with the higher priority trigger condition, wherein the object moves and re-orients in accordance with the particular set of flotation rules.

5. The method of claim 1 further comprising the steps of:
    the computer including, in the trigger, two or more trigger conditions, wherein the two or more trigger conditions trigger conflicting flotation rules, and wherein the conflicting flotation rules includes a trigger priority, and further wherein the trigger priority identifies a priority of each trigger;
    the computer identifying a trigger condition having a highest priority to form a highest priority trigger condition;

the computer identifying a particular set of flotation rules that are associated with the highest priority trigger condition to form a highest priority set of flotation rules; and
initiating one of the first set of flotation actions associated with the highest priority set of flotation rules.

6. The method of claim 1 further comprising the steps of:
the computer identifying a hierarchy for the set of flotation rules associated with the trigger condition, wherein each flotation rule in the set of flotation rules is associated with a ranking in the hierarchy;
the computer identifying a particular flotation rule in the set of flotation rules having a highest ranking in the hierarchy;
the computer identifying a location and orientation of a particular flotation action in the first set of flotation actions associated with the particular flotation rule in the set of flotation rules having the highest ranking; and
the computer initiating the particular flotation action in the first set of flotation actions associated with the particular flotation rule in the set of flotation rules having the highest ranking, wherein a flotation action associated with each flotation rule in the set of flotation rules is implemented in accordance with the ranking of each flotation rule in the hierarchy.

7. The method of claim 1, further comprising the steps of:
responsive to the most recent trigger condition having a lower priority than the plurality of existing trigger conditions, the computer averaging an optimal location and orientation of a fourth set of flotation actions associated with the plurality of existing trigger conditions, wherein the location and orientation associated with the most recent trigger condition is given a lesser weighting than other trigger conditions in the plurality of existing trigger conditions.

8. The method of claim 1 further comprising the steps of:
responsive to an occurrence of a plurality of trigger conditions, the computer identifying a priority of each trigger condition;
the computer identifying an optimal location and orientation associated with the set of flotation rules for each trigger condition; and
responsive to each trigger condition in the plurality of trigger conditions having a same priority, the computer averaging the optimal location and orientation associated with the set of flotation rules for each trigger condition.

9. The method of claim 1 wherein the avatar tracking data is retrieved from at least one of an object avatar rendering table.

10. A computer program product comprising:
one or more computer-readable tangible storage devices;
program instructions, stored on at least one of the one or more storage devices, to receive tracking data that identifies a location of an avatar in associated with a range of an object in a virtual universe, wherein the range comprises a viewable field;
program instructions, stored on at least one of the one or more storage devices, to identify a set of flotation rules associated with a trigger condition in response to the tracking data indicating an occurrence of the trigger condition, wherein the trigger condition is a most recent trigger condition in a plurality of existing trigger conditions;
program instructions, stored on at least one of the one or more storage devices, to identify an optimal location and orientation of the object for each flotation action in a first set of flotation actions associated with the set of flotation rules;
program instructions, stored on at least one of the one or more storage devices, to initiate the first set of flotation actions to float the object above a surface, wherein the object changes the location and orientation of the object in accordance with the first set of flotation actions associated with the set of flotation rules; and
program instructions, stored on at least one of the one or more storage devices, to, in response to the most recent trigger condition having a higher priority than the plurality of existing trigger conditions, average, using the computer, an optimal location and orientation of a second set of flotation actions associated with the plurality of existing trigger conditions, wherein the location and orientation associated with the most recent trigger condition is given a higher weighting than other trigger conditions in the plurality of existing trigger conditions.

11. The computer program product of claim 10 further comprising:
program instructions, stored on at least one of the one or more storage devices, to include, in the set of flotation rules, two or more flotation rules;
program instructions, stored on at least one of the one or more storage devices, to retrieve a priority for each one of the two or more flotation rules from an object floating control table; and
program instructions, stored on at least one of the one or more storage devices, to initiate a third set of flotation actions associated with a highest priority flotation rule in the set of flotation rules having the highest priority, wherein the object changes location and orientation in accordance with flotation actions that are associated with the highest priority flotation rule.

12. The computer program product of claim 10 further comprising:
program instructions, stored on at least one of the one or more storage devices, to identify constraints associated with the first set of flotation actions, wherein the location and orientation of the object is modified in accordance with the constraints.

13. The computer program product of claim 10 further comprising:
program instructions, stored on at least one of the one or more storage devices, to include, in the trigger, two or more trigger conditions;
program instructions, stored on at least one of the one or more storage devices, to retrieve a weighting for each trigger condition from an object floating control table;
program instructions, stored on at least one of the one or more storage devices, to identify a higher priority trigger condition using the weighting for each trigger condition; and
program instructions, stored on at least one of the one or more storage devices, to identify a particular set of flotation rules that are associated with the higher priority trigger condition, wherein the object moves and re-orients in accordance with the particular set of flotation rules.

14. The computer program product of claim 10 further comprising:
program instructions, stored on at least one of the one or more storage devices, to include, in the trigger, two or more trigger conditions, wherein the two or more trigger conditions trigger conflicting flotation rules, and wherein the conflicting flotation rules includes a trigger priority, and further wherein the trigger priority identifies a priority of each trigger;

program instructions, stored on at least one of the one or more storage devices, to identify a trigger condition having a highest priority to form a highest priority trigger condition;

program instructions, stored on at least one of the one or more storage devices, to identify a particular set of flotation rules that are associated with the highest priority trigger condition to form a highest priority set of flotation rules; and program instructions, stored on at least one of the one or more storage devices, to initiate one of the first set of flotation actions associated with the highest priority set of flotation rules.

15. The computer program product of claim 10 further comprising:

program instructions, stored on at least one of the one or more storage devices, to identify a hierarchy for the set of flotation rules associated with the trigger condition, wherein each flotation rule in the set of flotation rules is associated with a ranking in the hierarchy;

program instructions, stored on at least one of the one or more storage devices, to identify a particular flotation rule in the set of flotation rules having a highest ranking in the hierarchy;

program instructions, stored on at least one of the one or more storage devices, to identify a location and orientation of a particular flotation action in the first set of flotation actions associated with the particular flotation rule in the set of flotation rules having the highest ranking; and program instructions, stored on at least one of the one or more storage devices, to initiate the particular flotation action in the first set of flotation actions associated with the particular flotation rule in the set of flotation rules having the highest ranking, wherein a flotation action associated with each flotation rule in the set of flotation rules is implemented in accordance with the ranking of each flotation rule in the hierarchy.

16. The computer program product of claim 10, further comprising:

program instructions, stored on at least one of the one or more storage devices, to average an optimal location and orientation of a fourth set of flotation actions associated with the plurality of existing trigger conditions in response to the most recent trigger condition having a lower priority than the plurality of existing trigger conditions, wherein the location and orientation associated with the most recent trigger condition is given a lesser weighting than other trigger conditions in the plurality of existing trigger conditions.

17. The computer program product of claim 10 further comprising:

program instructions, stored on at least one of the one or more storage devices, to identify a priority of each trigger condition in response to an occurrence of a plurality of trigger conditions;

program instructions, stored on at least one of the one or more storage devices, to identify an optimal location and orientation associated with the set of flotation rules for each trigger condition; and program instructions, stored on at least one of the one or more storage devices, to average the optimal location and orientation associated with the set of flotation rules for each trigger condition in response to each trigger condition in the plurality of trigger conditions having a same priority.

18. A computer system for floating object transitions, the computer system comprising:

one or more processors, one or more computer-readable memories and one or more computer-readable tangible storage devices;

program instructions, stored on at least one of the one or more storage devices for execution by at least one of the one or more processors via at least one of the one or more memories, to receive tracking data that identifies a location of an avatar associated with a range of an object in a virtual universe, wherein the range comprises a viewable field;

program instructions, stored on at least one of the one or more storage devices for execution by at least one of the one or more processors via at least one of the one or more memories, to, in response to the tracking data indicating an occurrence of a trigger condition, identify a set of flotation rules associated with the trigger condition, wherein the trigger condition is a most recent trigger condition in a plurality of existing trigger conditions;

program instructions, stored on at least one of the one or more storage devices for execution by at least one of the one or more processors via at least one of the one or more memories, to identify an optimal location and orientation of the object for each flotation action in a first set of flotation actions associated with the set of flotation rules;

program instructions, stored on at least one of the one or more storage devices for execution by at least one of the one or more processors via at least one of the one or more memories, to initiate the first set of flotation actions to float the object above a surface, wherein the location and orientation of the object is modified in accordance with the first set of flotation actions associated with the set of flotation rules; and program instructions, stored on at least one of the one or more storage devices for execution by at least one of the one or more processors via at least one of the one or more memories, to, in response to the most recent trigger condition having a higher priority than the plurality of existing trigger conditions, average an optimal location and orientation of a second set of flotation actions associated with the plurality of existing trigger conditions, wherein the location and orientation associated with the most recent trigger condition is given a higher weighting than other trigger conditions in the plurality of existing trigger conditions.

* * * * *